United States Patent [19]

Knaus et al.

[11] 4,360,124

[45] Nov. 23, 1982

[54] FABRIC-REINFORCED, FLEXIBLE-WALLED CONTAINER AND METHOD OF MAKING SAID CONTAINER

[75] Inventors: Ernest Knaus; Raymond J. Namsick; Herbert D. Smith, all of Akron, Ohio

[73] Assignee: Goodyear Aerospace Corporation, Akron, Ohio

[21] Appl. No.: 194,173

[22] Filed: Oct. 6, 1980

Related U.S. Application Data

[63] Continuation-in-part of Ser. No. 82,345, Oct. 5, 1979, abandoned.

[51] Int. Cl.³ .............................................. B65D 90/04
[52] U.S. Cl. .................................... 220/452; 150/0.5; 220/457; 220/900; 244/135 B; 428/35; 428/246; 428/247; 428/250; 428/252; 428/253; 428/254; 428/912
[58] Field of Search ............... 428/109, 110, 245, 246, 428/250, 252, 253, 35, 247, 254, 911, 912; 220/415, 452, 461, 900, 457; 244/135 B; 150/0.5

[56] References Cited

U.S. PATENT DOCUMENTS

| | | | |
|---|---|---|---|
| 2,430,931 | 11/1947 | Hershberger | 220/900 |
| 2,700,181 | 1/1955 | Wilson | 156/598 |
| 2,802,763 | 8/1957 | Freedlander | 150/0.5 |
| 2,973,293 | 2/1961 | Schofield | 150/0.5 |
| 3,453,164 | 7/1969 | Gursky et al. | 156/217 |
| 3,567,536 | 3/1971 | Wikersham | 428/912 |
| 3,664,904 | 5/1972 | Cook | 150/0.5 |
| 3,723,234 | 3/1973 | MacDonald | 428/253 |
| 3,755,040 | 8/1973 | Robinson | 156/242 |
| 3,801,402 | 4/1974 | Suter | 156/182 |
| 3,814,658 | 6/1974 | Decker | 428/253 |
| 4,109,543 | 8/1978 | Foti | 428/246 |
| 4,149,921 | 4/1979 | Stannard | 244/135 B |
| 4,215,171 | 7/1980 | Marco et al. | 428/252 |

*Primary Examiner*—James J. Bell
*Attorney, Agent, or Firm*—L. A. Germain; P. E. Milliken

[57] ABSTRACT

A flexible, fabric-reinforced, complex-shaped container comprises a fabric reinforcement material and at least one facing layer of a polymeric or elastomeric material, said fabric comprised of yarns capable of changing their effective lengths upon being shaped to a complex mold configuration and thereafter maintained in that shaped condition by curing of the composite material. The method of the invention comprises applying a differential pressure to the fabric reinforced composite in a concave mold having the desired complex configuration to move the composite into the mold cavities as the effective length of the yarns change to conform to the mold and thereafter curing of the composite so as to set the composite to the mold shape.

8 Claims, 4 Drawing Figures

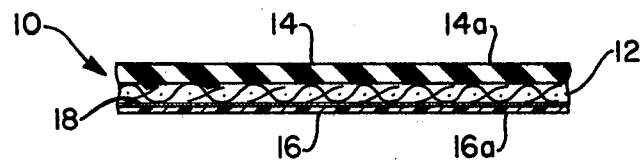
FIG.–IA
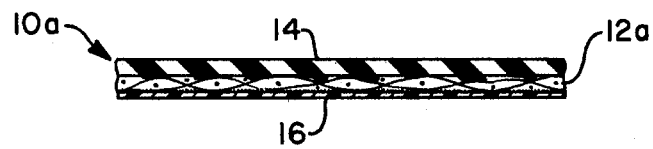
FIG.–IB
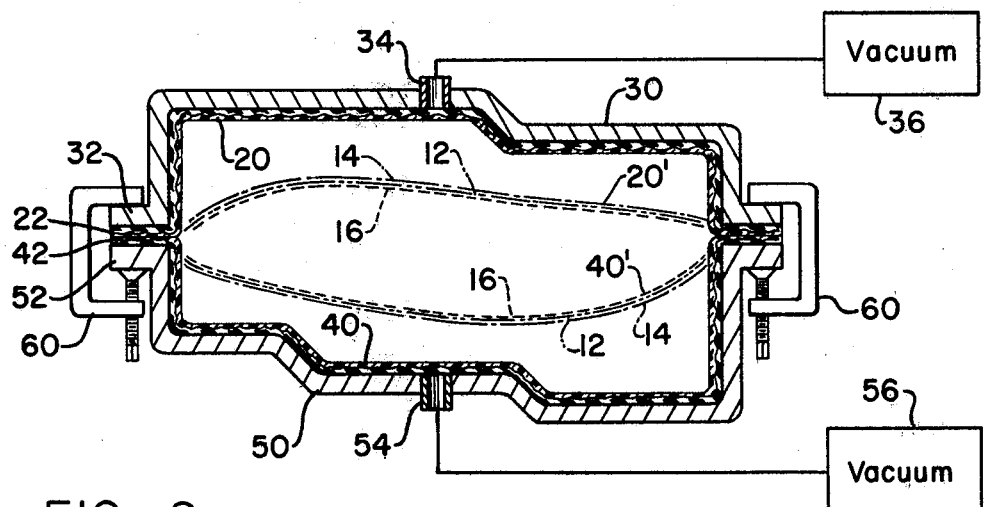
FIG.–2
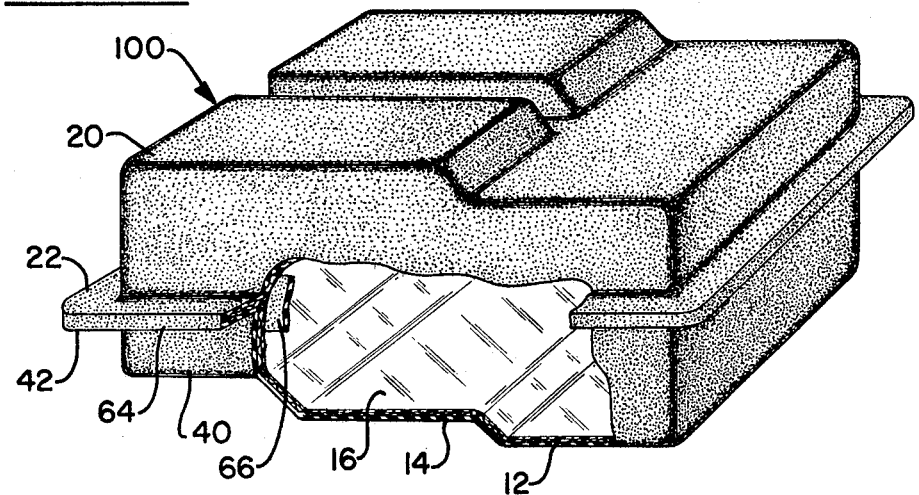
FIG.–3

FABRIC-REINFORCED, FLEXIBLE-WALLED CONTAINER AND METHOD OF MAKING SAID CONTAINER

BACKGROUND OF THE INVENTION

This is a continuation-in-part of application Ser. No. 082,345 filed Oct. 5, 1979, now abandoned.

This invention generally relates to composite materials and more particularly to a composite material for flexible-walled containers, tanks, fuel cells, and the like as may be applied to various automotive and/or aircraft applications. While the invention will be specifically described with respect to flexible containers for holding various volatile liquids such as for example automotive and/or aircraft hydrocarbon type fuels, it may as well be applied to other container applications for holding any type substance and these may include corrosive liquids and substances as well as non-volatile and non-corrosive substances.

More specifically, the invention relates to a unique fabric-reinforced composite having polymeric or elastomeric facing plys or layers, which composite is characterized by its ability to being formed into a complex container shape or configuration. A container comprised of the subject composite material, may be used in conjunction with a metal housing, tank, can or other type of rigid enclosure or it may be used independently, the manner of its use being dictated by the particular application. For example, a container of the type alluded to may be found in the art of light aircraft fuel cells wherein it is required that the fuel container conform to the complex volume-space provided within an aircraft wing. Containers of this type are also finding application in the automotive industry wherein the fuel tank container may be buried within the vehicle framework so as to be less vulnerable to damage and/or puncture. In either case, the flexible-container must conform to the volume-space provided in the vehicle whether such space is dictated by the body framework or by a separately mounted enclosure specifically designed for the space and into which the flexible-container is placed.

Conventionally, and in particular with respect to an aircraft type application, fuel containers have been made on rigid male forms wherein the structural components of the container are laid up by hand and subsequently cured to the shape of the form. Because of a need for reinforcement material in the aircraft type fuel container, conventional manufacturing techniques as are used for non-reinforced flexible-walled containers could not be applied inasmuch as the fabric reinforcement does not conform well to a complex shaped female mold using vacuum forming operations. Thus, male forms have been and are the conventional manufacturing technique for such complexly shaped containers and these forms are made of various type composition materials or for example a cardboard material that is sufficiently rigid to support the components of the container structure during lay-up and cure but which may be removed from within the cured container by dissolving the form material in a liquid substance. Upon being dissolved, the form material is washed out of the interior of the cured container through openings that are provided in the walls thereof for filling and/or emptying of the container. This prior art process is described in greater detail in U.S. Pat. No. 2,700,181 to R. F. Wilson.

Thus, the present method of making complexly shaped, fabric-reinforced, flexible-walled containers suffers a marked disadvantage in that it requires multiple and manual operations which must be carried out by skilled personnel. A further disadvantage of the present manufacturing operation is the fact that such male forms are individually hand-made for each and every container and the forms are ultimately destroyed in the process of removing them from within the cured container.

In one aspect of the present invention therefore, it is an object to provide a composite material for a complex-shaped, flexible-container that meets various volatile and/or corrosive substance or liquid holding requirements and which container may be manufactured without resort to hand built male forms and manual lay-up of the container structure.

In a further aspect of the present invention, it is an object to provide a composite material and a method of manufacturing a complexly shaped, flexible-container that eliminates male forms and obviates dissolving and washing out of the form material from within the cured container and associated contamination thereof by residual form material that may not have been completely dissolved and washed out of the interior of the container.

SUMMARY OF THE INVENTION

According to this invention, a composite for the manufacture of a flexible, fabric-reinforced container comprises a fabric reinforcement material and at least one facing layer of a polymeric or elastomeric material, said fabric comprising yarns exhibiting a change-in-effective-length characteristic upon being shaped to a complex configuration and thereafter set in the shaped configuration upon curing of the composite material. The method of the invention comprises applying a differential pressure on the fabric reinforced composite in a concave mold having the desired configuration to move the composite material into the mold cavities as the effective length of the yarns change to conform to the mold and thereafter curing of the composite so as to set the reinforcement to the mold shape.

BRIEF DESCRIPTION OF THE DRAWINGS

FIG. 1A is a sectional elevational view of a portion of the composite material prior to shaping and curing;

FIG. 1B is a sectional elevational view of the portion of composite shown in FIG. 1A after being formed to shape and cured;

FIG. 2 is an elevational view, in section and partially diagramatic, illustrating one method of manufacturing a complexly shaped container;

FIG. 3 is a perspective view, partially broken away to show the interior thereof, of a completed and cured flexible-walled complex-shaped container in accordance with this invention.

DETAILED DESCRIPTION OF THE INVENTION

Referring to FIG. 1A, a fabric reinforced composite structure is generally indicated by reference numeral 10. The structure 10 generally comprises a fabric reinforcement material 12 that is adhered to at least one ply or layer of a polymeric elastomer or a polymeric film. As illustrated in the drawing, an elastomeric gum layer 14 may be adhered to one surface of the fabric and/or a polymeric film layer 16 may be adhered to the opposite surface of the fabric by an appropriate adhesive gum 18, either or both facing layers meeting the purposes of the invention. When an elastomeric gum layer 14 is adhered to the fabric it will form an outside surface 14a of an enclosed container to be made from the composite while the polymeric film layer will form an inside surface 16a thereof.

The materials comprising the layers 14 and 16 may be any of the various polymeric and/or elastomeric materials known to the industry and these may or may not exhibit a resistance to volatile and/or corrosive substances dependent upon the actual end usage of the container to be manufactured. Materials that have been applied to nonreinforced, flexible-walled containers and which may be applied to this application are described in the art as exemplified in U.S. Pat. Nos. 3,755,040; 3,801,402; and 3,453,164 which are assigned to The Goodyear Tire & Rubber Company, Akron, Ohio.

The reinforcement fabric 12 is unique to this application and while many type synthetic and/or natural fibers may comprise the yarns of the fabric, nylon and/or polyester yarns are considered to best serve the purposes of the invention. The yarns may be in a woven or non-woven configuration but must exhibit a property such as to be capable of changing their effective lengths in at least orthogonal warp and weft directions of the fabric structure. This capability may be accomplished in either of two ways, the first being in the manner of manufacturing the filaments comprising the yarns of the fabric. For example, it is well known in the fabric industry that a synthetic filament may be drawn or stretched to an extent such that the molecules are oriented to improve the tensile properties of the filament. In this respect, a draw factor of approximately 4–6 times the original spun length of the filament is considered normal in the industry. Accordingly and in contrast to the normal drawing procedure, the first embodiment of this invention proposes drawing the filaments to a factor that is less than the normal, such as for example to a factor of 1–3 and making yarns and thereafter a fabric structure from these filaments. A fabric that is made up of these yarns, therefore, has a capability of being drawn further to the ultimate draw factor of from 4–6 if the conditions for such additional drawing exist. According to this invention, the conditions for such additional drawing may be provided in the process of forming flexible containers comprised of a fabric and polymer composite wherein it is required that the yarns of the fabric change their effective length so as to move into the cavities of a female mold forming the container shape. Thus, a fabric comprised of yarns exhibiting a draw factor of 1–3 may be extended to a final draw factor of 4–6 upon being shaped to the desired container configuration. Subsequent curing of the composite structure effects setting up of the fabric in the desired shaped condition. Yarns of the type alluded to are described in U.S. Pat. No. 3,842,583 assigned to E. I. duPont deNemours and Company, Wilmington, Del.

A second way in which the yarns may change their effective length involves yarns that comprise filaments originally drawn to a factor of from 4–6 according to the normal procedure and thereafter weaving said yarns into a stretch-knit type fabric or more specifically into a "jersey knit" type fabric. Knits, of course, are notoriously well known in the fabric industry and are woven in various configurations of the yarns such as to possess a stretching capability which may involve stretch in more than just warp and weft directions of the fabric structure. Knits of the type alluded to may also include fabrics known as Spandex. Accordingly, a second embodiment of the instant invention suggests a composite structure comprised of a stretch knit fabric faced with polymeric or elastomeric layers. When the composite is shaped to a complex configuration, the yarns of the knit extend their effective length to conform to the shape and contours of a female mold cavity. Subsequent curing of the composite effects maintaining the fabric in the shaped condition.

FIG. 1B attempts to illustrate the change effected in the length of the fabric yarns of the composite 10 of FIG. 1A upon being shaped and cured to a specific configuration. The shaped and cured composite is indicated by reference numeral 10a while the extended fabric is generally indicated by reference numeral 12a.

Referring to FIG. 2, one method of making a flexible fabric-reinforced container using a composite according to either of the above-described embodiments is shown. The container, generally indicated as a whole by reference numeral 100, is characterized by being complexly shaped and comprises a top half portion 20 and bottom half portion 40. The top portion 20 is formed from a flat section of composite material 10 that is placed in a mold 30 forming the top portion of the container while the bottom portion 40 is formed from another flat section of composite material 10 that is placed in a mold 50 forming the bottom portion of the container 100. The ghost-line showing 20', 40' illustrates the manner of positioning the composite material so that the elastomeric layer 14, when such is used, faces into the mold cavity while the film layer 16' when it is used, faces outwardly of each mold cavity. The mold sections 30 and 50 have matching peripheral edges 32 and 52 respectively, which when positioned in edge-to-edge relationship form a complete enclosure with suitable venting arrangements. Clamping means 60 positioned about the periphery of the mold mate the two mold halves 30, 50 in a pressure tight and sealed condition while connections 34 and 54 are provided to connect to sources 36 and 56 for providing a differential pressure upon the composite material portions 20 and 40. Of course it is anticipated that a positive pressure within the enclosure may also be used to force the composite material 10 into the confines of the mold and this is considered to be within the knowledge and skill of those persons familiar with the molding arts. In any case, it will now be appreciated that a differential pressure on the composite material 10 will effect a change in length of the reinforcement fabric yarns as the composite moves to fill the mold cavity. It should also be appreciated that when the film 16 is provided and is, for example a thermoplastic barrier film, the ability of the differential pressure to move the composite to conform to the mold contours is enhanced. This is especially true when a vacuum is drawn on the molds to pull the composite material into the confines of the mold cavity. While the layer 16 may be an elastomeric layer, the character of the elastomer will make it more difficult to uniformly move the composite 10 into the deep confines of the mold. Thus, a thin thermoplastic barrier film 16 of, for example nylon, is preferred for most container applications. When it is determined that the composite material 10 has substantially filled the shape of the mold cavity, the unit is subjected to a vulcanization atmosphere such as to cure the elastomeric and/or polymeric elements of the composite. In this manner, the yarns of the fabric 12 which are extended to conform to the mold shape are maintained in that shaped condition by reason of the cured polymeric or elastomeric elements.

FIG. 3 illustrates a complex-shaped, flexible-walled, fabric-reinforced container 100 made in accordance with this invention, and in which the top portion 20 is integrally molded to the bottom portion 40 by reason of the molded flanges 22 and 42 respectively. While for most applications an integrally molded flange 64 will be sufficient, the container may be strengthened and rigidized by inserting additional elastomeric material at the juncture of the flanges. This may be accomplished by a polymeric or elastomeric strip applied to the inside of the container such as at 66 in the drawing or it may be applied between the flanges 22, 42 or to the outside in any suitable and acceptable manner.

As an alternative procedure, the container may be partially cured and the flange material 64 trimmed off. Reinforcement material 66 may then be applied to the interior and/or exterior of the container at the juncture of the upper and lower units 20, 40 and thereafter finish cured into an integral unit. Also, if the elastomeric material layer 14 is a thermoplastic, it is anticipated that the junction of the upper and lower container portions 20, 40 may be welded upon completion of the curing operation. This may be accomplished by one of the known heating procedures including ultrasonic, dielectric or microwave heating. The procedure will also facilitate separate forming and curing of the top and bottom container halves which may then be brought together and welded into an integral unit.

As herebefore mentioned, a container made in accordance with this invention may be used in conjunction with a separate metal housing, tank, or other type rigid structure. For example, in an automotive application, the flexible composite material may be mounted as a liner in a conventional automobile tank. In this respect and in the process of making the flexible-walled container, a particular configuration for an automotive fuel tank may be used as the mold for the container. Thus, mold halves 30 and 50 will actually utilize the metal upper and lower tank halves respectively as an integral part of the mold and the composite material 10 is mounted therein in the same manner as described with respect to the molds 30, 50. The peripheral flanges may be bolted, riveted, welded or affixed in some other permanent manner and the tank unit subjected to a differential pressure to draw the composite material into the confines and shape of the tank. The entire unit is thereafter subjected to an appropriate curing temperature to cure and set the composite material to the shape of the tank, and it becomes an integral part of the tank assembly.

While certain representative embodiments and details have been shown for the purpose of illustrating the invention, it will be apparent to those skilled in the art that various changes and modifications may be made therein without departing from the spirit or scope of the invention.

What is claimed is:

1. A fabric-reinforced, complex-shaped, flexible-walled container for holding a volume of a volatile liquid hydrocarbon fuel is characterized by upper and lower sections joined at their peripheries by a molded seam to form a complete volume enclosure, each section vacuum formed in a female mold from a composite material comprising in combination:

a fabric reinforcement comprised of yarns exhibiting a change-in-effective-length characteristic so as to stretch and conform to the container complex configuration upon vacuum forming thereof;

an elastomeric adhesive gum adhered to one surface of the fabric;

an air-impervious nylon plastic film adhered to the adhesive gum and forming the interior ply of the container, said film exhibiting a resistance to the deleterious affects of volatile fuels to provide a barrier against penetration of the fuel into the composite while also enabling vacuum drawing of the composite into the confines of a female mold; and an elastomeric gum adhered to the other surface of the fabric and forming the outside ply of the container, said gum penetrating the interstices of the fabric to bond to the adhesive gum upon stretching and forming of said fabric to set and maintain the yarns of the fabric to the shaped container configuration upon curing of the elastomer.

2. The container as set forth in claim 1 wherein the reinforcement fabric comprises nylon yarns.

3. The container as set forth in claim 1 wherein the reinforcement fabric comprises polyester yarns.

4. The container as set forth in either claims 2 or 3 wherein the fabric comprises warp and weft yarns that are interwoven.

5. The container as set forth in either claims 2 or 3 wherein the fabric comprises warp and weft yarns that form a nonwoven fabric.

6. The container as set forth in claim 1 wherein the yarns exhibit a draw factor of approximately 1.0–3.0 prior to being shaped and which upon being shaped to the complex container configuration exhibit a draw factor of 4.0–6.0.

7. The container as set forth in either of claims 2 or 3 wherein the yarns exhibit a draw factor of approximately 1.0–3.0 prior to being shaped and which upon being shaped to the complex container configuration exhibit a draw factor of 4.0–6.0.

8. The container as set forth in either of claims 2 or 3 wherein the yarns are woven into a stretch knit construction and exhibit a draw factor of 4.0–6.0 both prior to and after being shaped to the complex container configuration.

* * * * *